United States Patent [19]

Hlava

[11] Patent Number: 4,535,561

[45] Date of Patent: Aug. 20, 1985

[54] TWO PIECE MOLDED ADJUSTABLE ROD HANDLE

[75] Inventor: Lorens G. Hlava, Tulsa, Okla.

[73] Assignee: Brunswick Corporation, Skokie, Ill.

[21] Appl. No.: 510,728

[22] Filed: Jul. 5, 1983

[51] Int. Cl.³ .............................................. A01K 87/06
[52] U.S. Cl. ........................................................... 43/22
[58] Field of Search ............................. 43/22, 23, 18.1

[56] References Cited

U.S. PATENT DOCUMENTS

| | | | |
|---|---|---|---|
| 651,148 | 6/1900 | Shakespeare | 43/22 |
| 1,350,637 | 8/1920 | Beaty | 43/22 |
| 3,883,978 | 5/1975 | Ohmura | 43/22 |
| 4,432,155 | 2/1984 | Miller | 43/22 |

FOREIGN PATENT DOCUMENTS

| | | | |
|---|---|---|---|
| 2454560 | 9/1975 | Fed. Rep. of Germany | 43/22 |
| 544100 | 6/1956 | Italy | 43/22 |

*Primary Examiner*—Gene P. Crosby
*Attorney, Agent, or Firm*—Wood, Dalton, Phillips, Mason & Rowe

[57] ABSTRACT

An adjustable telescoping fishing rod handle comprising an adjustably mating foregrip and buttgrip. The foregrip has a substantially rectangular recess for reception of a reel foot. At the forward extremity of the recess is a rearwardly opening slot for reception of one leg of the reel foot. The other end of the foot is engaged within an annular undercut in the buttgrip. The foregrip and buttgrip are threadably mated so that upon rotating the buttgrip in a first direction relative to the foregrip, the spacing between the slot and the undercut is diminished so as to closely and positively capture the reel foot whereby the escape of either leg from the slot and undercut is prevented. Rotation of the buttgrip relative to the foregrip and oppositely of the first direction frees the foot for disassembly of the reel from the rod.

3 Claims, 6 Drawing Figures

TWO PIECE MOLDED ADJUSTABLE ROD HANDLE

DESCRIPTION

1. Technical Field

This invention relates to fishing rods and more particularly relates to an adjustable two-part rod handle.

2. Background Art

In conventional construction, fishing reels generally have a stem formed integrally with the reel body, which stem has an elongate foot for attachment with a rod handle. Generally a one-piece construction is employed for the rod handle. In one particular arrangement, the handle is recessed to accommodate the reel foot, which reel foot is clamped in position.

Such a construction is exemplified in U.S. Pat. No. D. 228,759 to Ohmura. In Ohmura, a rearwardly opening slot is formed at the forward portion of the recess for reception of the one end of the reel foot. The opposite end of the foot is retained by a springloaded clamp. The clamp is loosened during assembly to accept the rear end of the foot after the forward end is placed. With the clamp tightened, the foot is captured closely within and against the bottom wall of the recess. While the handle in Ohmura is specifically designed for reel mounting on the upper surface of the rod, the same type mounting structure is commonly employed to mount a reel beneath the rod.

The above construction has numerous drawbacks. The handle is limited as to the range of reel types that can be accommodated. The length of the reel foot may vary, depending upon the make of the reel and the type of tackle utilized. The Ohmura handle with its fixed recess dimension thus has limited versatility.

The Ohmura-type handle is also undesirable in that secure reel mounting generally requires the use of a screwdriver or other tool. The Ohmura knob is provided with a slot for a screwdriver, or like tool, for this purpose. While the clamping force on the foot is adjustable through a knurled control knob, it is generally not possible to tighten the reel satisfactorily by hand. Unless the reel is tightened sufficiently to eliminate play, the clamp might progressively loosen during use. The constant adjustment required is an inconvenience to the operator.

Further, with the mounting shown in Ohmura used to secure a spinning reel, the fingers of the operator will be situated in the recess as the rod is grasped during use. This irregular surface is uncomfortable for the user.

As an alternative to the above mounting, the rod handle is sometimes provided with a pair of longitudinally spaced, cooperating rings. Each ring defines a slot opening toward the other into which the free ends of the reel foot are disposed. One of the rings is movable lengthwise of the handle by a control ring threadably engaged with the handle. Advancement of the control ring reduces the spacing between the slots, thereby permitting close capture of the reel foot.

Such a structure is complicated from the standpoint of manufacture, as is the type handle depicted in Ohmura. Further, the rings are situated so as to constantly be contacted by the operator as the rod is held. Aside from the possible discomfort to the user, the ring arrangement is undesirable in that one tends to loosen the control ring during operation. The reel might then possibly separate from the rod.

The present invention is directed to overcoming the above enumerated problems.

DISCLOSURE OF INVENTION

The present invention comprises a two-part fishing rod handle for mounting the foot of a fishing reel. The forward handle part, the foregrip, defines a rearwardly opening slot for reception of one free end of the reel foot. The rearward handle part, the buttgrip, has a forwardly opening circular undercut to accommodate the opposite end of the foot. The foregrip and buttgrip are mated so as to be adjustable lengthwise, each relative to the other, as to vary the spacing between the sloping walls defining the slot and the undercut between which the reel foot is captured.

It is the principal object of the present invention to provide an inexpensive versatile rod handle that is capable of simply and positively mounting most types of fishing reels.

In a preferred form, the foregrip and buttgrip are both molded from a lightweight material, such as plastic. The foregrip has a recessed region to receive the reel foot and has the sloping wall of the slot at the forward extremity of the recess. The buttgrip has the opposed sloping wall formed by the undercut defining an annular, forwardly facing wall engageable with the rear end of the foot.

The buttgrip and foregrip are mated threadably to permit adjustment of the longitudinal spacing between the sloping walls. In one form of the invention, the foregrip has a threaded stem coaxially aligned with a cylindrical sleeve defining an annular space joining with the undercut. The buttgrip mates within the annulus and has a longitudinal bore threadably engaged with the stem. Fixing of the fishing reel involves rotating the foregrip and buttgrip relative to each other to closely capture the ends of the reel foot. The reel is freed by effecting opposite relative rotation of the elements.

The handle, so constructed, will accommodate any reel to the extent permitted by the length of the opening into the recess and by the length of the threaded stem and bore. Securing and releasing of the reel involves merely twisting the foregrip and buttgrip relative to each other. The surfaces of the foregrip and buttgrip are easily grasped to positively torque the mated parts. Thus no tools are needed to securely tighten the reel. Further, the foregrip and buttgrip can be molded to provide a smooth, substantially uninterrupted grasping surface, affording great comfort to the operator.

Another aspect of the invention is to provide a restricted entry to the slot and to the undercut so that the tapered legs of the reel foot become wedged during assembly. As the buttgrip is advanced, the legs of the reel foot cause the walls at the entry slot and undercut to flex slightly, creating a restoring force in the walls that securely clamps the foot. This arrangement adds an additional dimension to the handle, assuring more positive mounting of the reel.

DESCRIPTION OF THE PREFERRED EMBODIMENT

Figure 1:
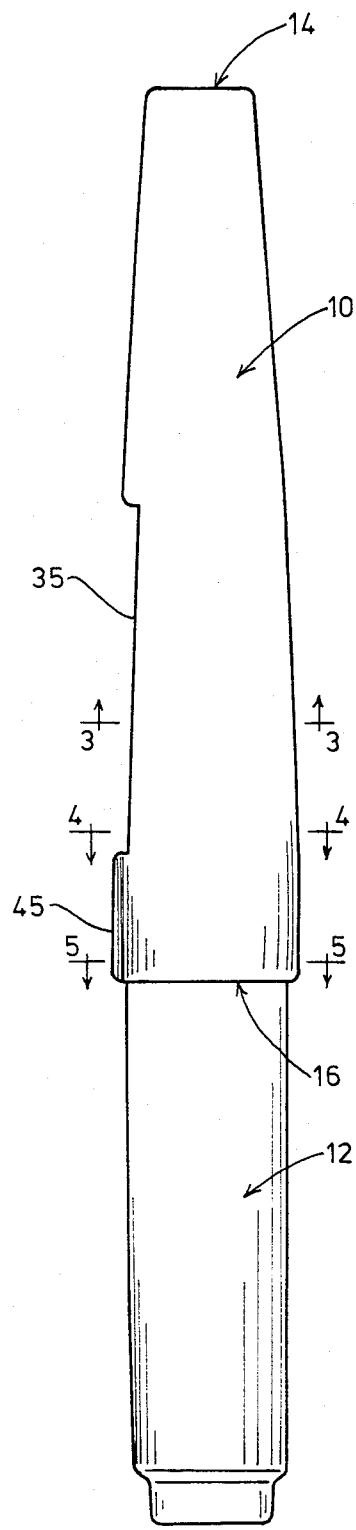
FIG. 1 is a side elevation view of a preferred form of the rod handle.
Figure 2:
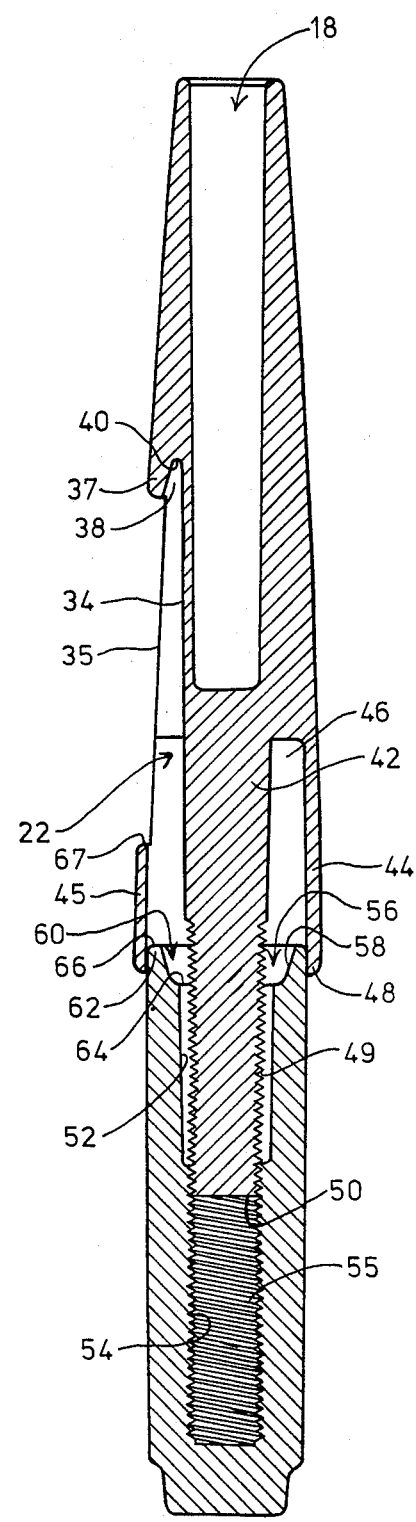
FIG. 2 is a cross-sectional side view of the rod handle.
Figure 3:
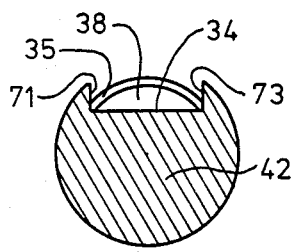
FIG. 3 is a sectional view of the rod handle taken along line 3—3 of FIG. 1.
Figure 4:
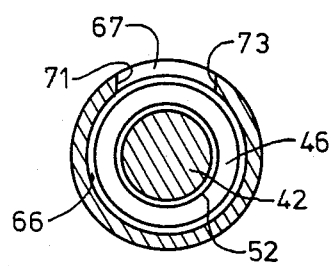
FIG. 4 is a sectional view of the rod handle taken along line 4—4 of FIG. 1.
Figure 5:
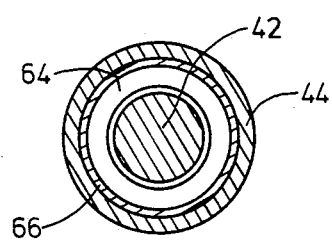
FIG. 5 is a sectional view of the rod handle taken along line 5—5 of FIG. 1.

Referring initially to FIG. 1, a preferred form of the invention can be seen to include generally a mating foregrip 10 and buttgrip 12, which cooperatively make up the rod handle. The details of the rod handle are shown in the remaining FIGS. 2-6.

Both the foregrip 10 and buttgrip 12 are of an elongate construction with a substantially circular cross-sectional configuration transverse to their length. The foregrip 10 has a gradual, progressive taper between its front end 14 and trailing end 16. The free end of a fishing rod (not shown) is fit in a tapered hollow 18 in the forward part of the foregrip 10 in a conventional manner. A fishing reel mounting foot 20 (FIG. 6) is received within a framed recess 22 intermediate the length of the foregrip 10.

The mating buttgrip 12 has a substantially cylindrical configuration, tapering slightly from front to rear to afford in cooperation with the foregrip a smooth, comfortable gripping surface for the operator. The overall handle configuration is representative only and should not be viewed as limiting. For example, the buttgrip 12 might be substantially longer than illustrated so as to be functional to boat mount the rod.

Figure 6:
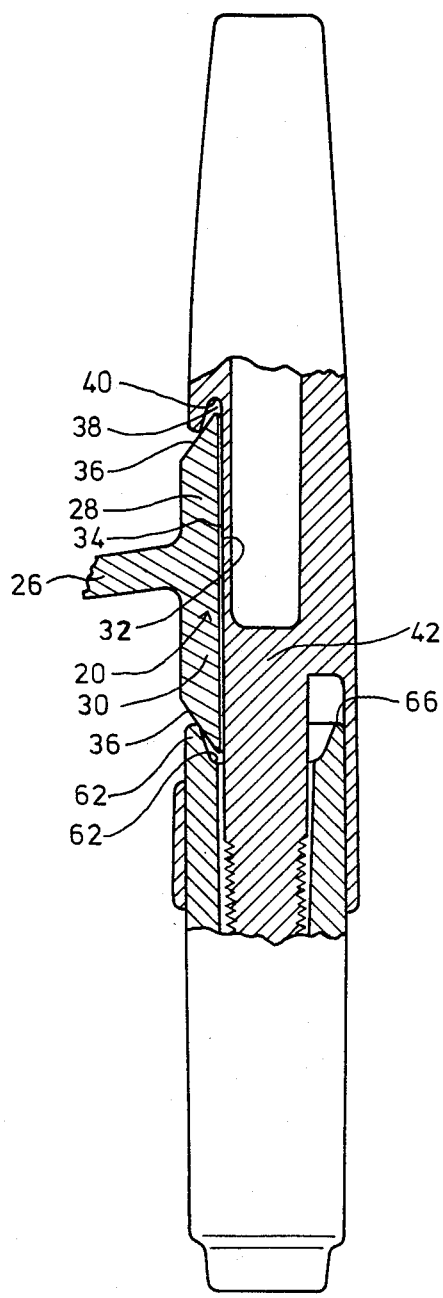
FIG. 6 is a side, elevation view of the rod handle partially broken away to show a reel mounting foot assembled with the rod handle.

The reel mounting foot 20, which is secured within the recess 22, is shown in FIG. 6. The foot 20 is formed integrally with a stem 26 extending between the reel body and an intermediate position on the length of the foot 20 as to define a forwardly projecting leg 28 and a rearwardly projecting leg 30. The foot 20 either may have a flat bottom surface 32 to flushly engage a mating flat wall 34 at the bottom of the recess 22 or may have a slightly concaved surface for mating with a slightly convexed surface on the bottom wall 34 of the recess. The legs 28,30 are of varying lengths fore and aft of the stem 26, each having a ramp 36 tapering toward its free end.

The opening 35 in the wall of the foregrip 10, through which access to the recess 22 is gained, is substantially rectangular, to approximate the shape of the conventional reel foot. At the forward end of the recess 22 is an overhanging lip 37 defining a rearwardly opening slot 38. The slot has a radial dimension and longitudinal extent such that the tapered ramp 36 of the leg 28 will be wedged closely within the slot 38 against the sloping wall 39 of the slot 38 before the forward edge of the leg 28 comes in contact with the wall 40 at the forward extremity of the recess 28, with the reel foot 20 secure against the bottom wall 34 of the recess.

The foregrip 10 has an integrally formed cylindrical stem 42, forming with the outer wall portion 44 of the foregrip 10 an annular space 46 for reception of the mating buttgrip 12, as described below. The stem extends rearwardly beyond the free edge 48 of the foregrip 10 and has threads 49 at its free end portion and at least partially along its length. A portion of the wall 44 forms a continuous ring 45 concentric with the stem 42 to define one edge 67 of the rectangular opening 35. The recess 22 is accessed through the opening 35 and has substantially parallel side walls 71,73.

The foregrip 10 and buttgrip 12 are assembled telescopingly, each within the other. The buttgrip 12 has a first tapered bore 52 extending from its forward end to a depth at least equal to the unthreaded portion of the stem 42. A reduced diameter bore 54 extends concentrically with and axially beyond the first bore 52 and has threads 55 internally for engagement with the threads 49 on the free end portion of stem 42.

The buttgrip has an annular or circular undercut 56 concentrically about the mouth of the bore 52. The radial extension of the undercut is chosen so that the overhanging lip 62 defines an undercut surface or sloping walls 58 which, in conjunction with the outer surface of the stem 42, forms a forwardly opening rear slot 60 to receive the rearwardly directed leg 30 of the foot 20. As with the forward slot 38, the dimension of the circular undercut 56 is such that the ramp 36 on the rear leg 30 is pressured between the sloping wall 58 of the overhanging lip 62 and the bottom wall 34 of the recess before the rear edge of the leg 30 abuts the forwardly facing annular wall 64 at the extremity of the undercut 56. With the forward leg 28 engaged in the recess 22 and the bottom surface 32 of the reel foot 20 against the bottom wall 34 of the recess 22, the buttgrip 12 is rotated relative to the foregrip 10 in a first direction, causing the buttgrip 12 to be advanced toward the foregrip, and thereby reducing the overall length of the handle. With the buttgrip sufficiently advanced relative to the stem, the rear leg 30 will intersect in the undercut 56 and become wedged. Additional rotation in the first direction biases the overhanging lips 37 and 62 defining the slots 22 and undercut 56, respectively, radially outwardly, thereby amplifying the wedging effect. It can be seen at this stage that the foot is closely captured between the sloping walls 39,58 in the slot 38 and undercut 56.

Removal of the reel involves merely rotating the buttgrip 12 oppositely to the first direction. With the forward edge 66 of the buttgrip 12 retracted sufficiently to be even with or rearward of the edge 67 of the opening 35 at the rear of the entrance opening to the recess 22, the rear leg 30 of the reel foot can be tilted out of the recess. Similarly, to assemble the reel, the buttgrip is withdrawn and the forward leg 28 of the foot is introduced to the slot 38 with the foot angularly disposed. The foot can then be pivoted toward the recess 22 to engage the bottom surface of the foot with the wall 34 at the bottom of the recess to align the rear leg 30 with the undercut 56. Consequently, the rectangular opening 35 in the foregrip 10 at the recess 22 should be dimensioned sufficiently to admit the rear leg 30 within the recess with the forward leg 28 positioned in the slot 38. In the alternative, the rear leg 30 may be inserted first and slid rearward under the ring 45 whereupon the forward leg 28 can be dropped down into the recess with the leg 28 aligned with the slot 38. Tightening the buttgrip will seat the reel on the handle. The system permits the foot 20 to be slightly longer than the opening 35.

It should be understood, of course, that the specific forms of the invention illustrated and described herein are intended to be representative only, as certain changes and modifications may be made without departing from the scope of the teachings herein disclosed. Accordingly, reference should be made to the appended claims in ascertaining the full scope of the invention.

I claim:

1. A telescoping fishing rod handle for mounting a rod and a fishing reel of the type having an elongate mounting foot with forwardly and rearwardly directed legs, each leg tapering toward a free end, comprising:

a foregrip having a rearwardly opening slot for reception of the forwardly directed leg of the reel foot, a sloping wall surface extending from the entrance to the slot into the slot, a longitudinally directed stem threaded at least partially along its length and an outer continuous wall which in conjunction with the stem, forms an annular, cylindrical recess; and a buttgrip having an outer peripheral wall, an annular forwardly opening undercut for the reception of the rearwardly directed leg of the reel foot defined cooperatively between an end of the peripheral wall and the stem, a sloping wall surface defined at said end of the peripheral wall extending from the entrance to the undercut into the undercut and being continuous about the periphery of the undercut, and an internally threaded bore for mating with the stem, the buttgrip extending within the cylindrical recess, said foregrip and buttgrip being adjustably movable, each toward and away from the other in a lengthwise direction by effecting relative rotation between the foregrip and buttgrip about a longitudinal axis, the forwardly and rearwardly directed, tapering legs being of a dimension to wedge respectively within the slot and the undercut, the adjustment of the buttgrip and foregrip toward each other captures the foot in a mounted position between the sloping walls of the slot and the undercut and adjustment of the foregrip and buttgrip away from each other permits the reel foot to be freed for disassembly of the reel.

2. A telescoping fishing rod handle for mounting a rod and a fishing reel of the type having an elongate mounting foot with forwardly and rearwardly directed legs, each leg tapering toward a free end, comprising:

a foregrip having a longitudinally directed stem threaded at least partially along its length, a continuous peripheral outer wall, a substantially rectangular opening in the outer wall, a rearwardly opening slot for reception of the forwardly directed leg of the reel foot and a sloping wall surface extending from the entrance to the slot into the slot; and a buttgrip defining an internally threaded bore for mating with the stem and an annular forwardly opening undercut for the reception of the rearwardly directed leg of the reel foot said undercut defined by a sloping surface on a peripheral wall of the buttgrip in conjunction with the stem, said sloping wall surface extending from the entrance to the undercut into the undercut and being continuous about the periphery of the undercut;

said continuous peripheral outer wall of the foregrip, in conjunction with the stem, forming an annular cylindrical recess, the peripheral wall of the buttgrip extending within the cylindrical recess, said foregrip and buttgrip being adjustably movable, each toward the other in a lengthwise direction by effecting relative rotation between the buttgrip and foregrip, the forwardly and rearwardly directed, tapering legs capable of wedging respectively within the slot and the undercut, the adjustment of the buttgrip and foregrip toward each other captures the foot in a mounted position between the sloping wall surfaces of the slot and the undercut and adjustment of the foregrip and buttgrip away from each other permits the reel foot to be freed for disassembly of the reel.

3. The fishing rod handle of claim 2 wherein the foregrip has a substantially rectangular recessed region for receiving the foot of the reel and the recessed region is joined with the rearwardly facing slot and the annular, cylindrical recess.

* * * * *